July 19, 1966  B. HANSSON  3,261,195

METHOD FOR EXTRUDING PIPE OF METAL OR SIMILAR MATERIAL

Filed Aug. 31, 1964

Prior Art

INVENTOR.
BROR HANSSON

United States Patent Office 3,261,195
Patented July 19, 1966

3,261,195
METHOD FOR EXTRUDING PIPE OF METAL OR SIMILAR MATERIAL
Bror Hansson, Stockholm, Sweden, assignor to Allmanna Svenska Elektriska Aktiebolaget, Vasteras, Sweden, a corporation of Sweden
Filed Aug. 31, 1964, Ser. No. 393,231
2 Claims. (Cl. 72—256)

Figure 1:
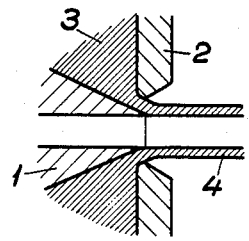
Figure 2:
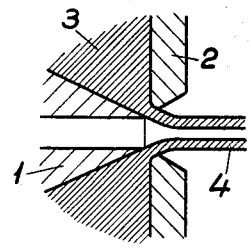
Figure 3:
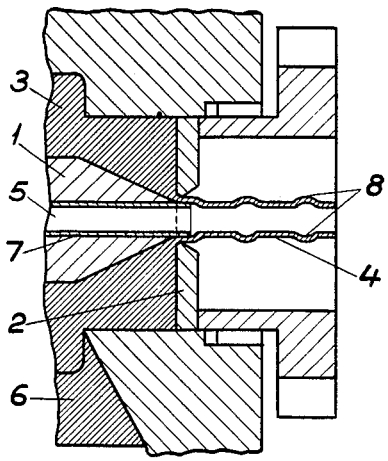
Figure 4:
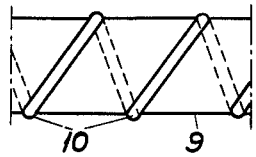

By explaining the present invention reference is made in the following FIGURES 1–4 in the enclosed drawing. FIGURES 1 and 2 illustrate known press processes with different adjustments of the forming tools of an extrusion press. FIGURE 3 exemplifies a method in accordance with the present invention to process the surface of an extruded tube, for example a cable sheath with the help of an auxiliary tool after the tube has left the forming tool of the press. FIGURE 4 finally shows an example of a product manufactured according to the invention.

By extrusion of tubes of metal or similar material, as for example plastic material, the forming tools of the press can be placed differently in relation to each other, as is evident from FIGURES 1 and 2. In these figures, 1 designates a hole guider, 2 a press forming die, 3 a material in the press which is pressed out between the hole guider and the forming die, and 4 the tube which is formed from the mentioned material after the passage of the forming tools of the press. In accordance with FIGURE 1 which shows a normal pressing process the position of the tools is such that the material subjected to extrusion leaves the tools almost in the axial direction. In accordance with FIGURE 2, which shows a throttled pressing process the position of the tools are, on the contrary, such that the material subjected to extrusion leaves the tools in a direction inclined to the axis through the hole guider and the forming die. In the first case the formed tube 4 receives about the same outer diameter as the inner diameter at the forming die 2. In the last case, where the hole guider and forming die are displaced from each other, the inner diameter at the tube 4 can be made smaller than the hole diameter of the guider 1.

By extrusion of metals and certain plastic materials in the form of tubes, cable sheaths and similar products, it is difficult to vary the dimensions and shape of the extruded product during the pressing because of the large forces which would be required in order to vary the mutual position of the tools. The difficulties are caused by the very high pressure in the extrusion press, which is required for extruding metals and certain plastic materials and which acts on the tools. Owing to the necessary high pressure the inner friction in the material subjected to extrusion is great at that moment when it is driven forward through the tools.

According to the present invention, these difficulties are overcome by the extruded tube being subjected to a shape change after its formation and while it still has a suitable processing temperature, but after the material has left the interior of the press so that it is no longer subjected to the high pressure prevailing there. The invention relates to a method for extrusion of tubes, as for example a cable sheath around one or several cable parts, of metal or similar material, such as plastic material, especially of material for which high extrusion pressure is required, in a press with forming tools, to effect variations in the dimensions or shape of the extruded tube. The method according to the invention is characterized in that after the extruded tube has left the forming tools of the press and is not subjected to the pressure prevailing in the press, an auxiliary tool (shape changing tool) for non-cutting shaping is brought to process the surface of the tube while the tube is still soft and pliable to an outer shape which diverges from that of the straight cylinder.

In the following a number of embodiments of the invention are described with reference to the FIGURES 3 and 4, mentioned previously.

In FIGURE 3 the hole guider or mandrel 1 and forming die 2 with the extrusion orifice are arranged according to FIGURE 2 to bring about a throttled pressing process, for example to press out the fluent press material 3 to a sheath 4 which normally fits to a cable not shown, which is introduced through an opening 5 of the guider. The press chamber with the press material 3 has a cylinder 6 connected to it, in which a piston or screw effects the necessary pressure on the introduced material in the press chamber. Through an axially displaceable auxiliary tool 7 in the shape of a tube whose inner diameter is larger than the inner diameter of the tube, which is shaped in a throttled process by the molding tools 1 and 2 of the press, being arranged inside the hole guider 1, the cable casing can be supplied with ridges 8 facilitating bending of the cable. The ridges are brought about by the tool 7 being relatively quickly alternately pulled in or pushed out of the guider. The tool 7 processes the tube soon after it has left the tools 1 and 2 of the press and while it is still fluent. When the auxiliary tool is pushed to and fro at regular time intervals, the ridges are formed at regular distances. It is remarkable that the method requires so little mechanical strength of the tool 7 that a tube with very thin walls which does not prevent the passage of the cable can be used. If the method is applied for the manufacture of tubes which do not surround material arranged inside them such as the cable sheath, the tool 7 can also consist of a cylindrical rod or mandrel.

A pipe 9 or a cable casing with helically formed ridges 10 in accordance with FIGURE 4 can be manufactured if the tool 7 in the shape of a mandrel or a tube is supplied with a protuberance, e.g. in the form of a tip arranged on the envelope surface of the mandrel or tube at its outer end and the tool 7 is rotated. In this case not only a throttled pressing process according to FIGURE 2, but also a normal pressing process can be used, if the tip or other protuberance is arranged on the tool 7 so that it protrudes somewhat radially outside the elongation of the envelope surface of the opening 5 in the guider 1.

With the use of the arrangement according to FIGURE 3, tubes can also be made, the diameter of which undergo a continual change, i.e. conical tubes. If the tool 7 in the form of a tube or cylindrical mandrel from a drawn-out position is very slowly displaced inwards in the hole guider while the press material is pressed out of the press, a tube is formed with continuous, evenly decreasing diameter.

It is obvious that the invention can be applied in several other cases than those exemplified in order to bring out regular or irregular variations of dimensions and shapes of extruded tubes and cable sheaths.

I claim:
1. A method of manufacturing tubular members having ridges in radial planes in an extrusion press having a mandrel around which material is expressed and an extrusion orifice cooperating with the mandrel, and having a cylindrically shaped member slidable within the mandrel for movement outwardly from the end thereof towards the orifice, the steps of extruding a fluent material over the mandrel and through the orifice in a radially inward direction, and moving said cylindrical member, during such extrusion, between positions in which its free end is inside of and outside of said opening, said end reaching the position outside said opening while the material is still fluent.
2. A method as claimed in claim 1 in which the member is pushed backwards and forwards in the orifice at regular time intervals to form ridges at regular distances apart on the tubular member extruded from the press.

References Cited by the Examiner

UNITED STATES PATENTS

| | | | |
|---|---|---|---|
| 413,460 | 10/1889 | Roney | 72—260 |
| 1,423,361 | 7/1922 | Rockwell | 72—56 |
| 3,019,481 | 2/1962 | Negoro | 18—14 |

FOREIGN PATENTS

| | | |
|---|---|---|
| 752,056 | 7/1956 | Great Britain. |
| 935,634 | 8/1963 | Great Britain. |
| 935,784 | 8/1963 | Great Britain. |

CHARLES W. LANHAM, *Primary Examiner.*

E. D. O'CONNOR, H. D. HOINKES,
*Assistant Examiners.*